United States Patent
Baumann et al.

(10) Patent No.: US 9,032,618 B2
(45) Date of Patent: May 19, 2015

(54) METHOD FOR INSULATING A CONDUCTIVE BAR

(75) Inventors: Thomas Baumann, Wettingen (CH); Massimiliano Vezzoli, Remigen (CH); Thomas Hillmer, Suhr (CH); Thomas Widmer, Esslingen (CH); Dieter Stoll, Mellingen (CH); Clemens Dransfeld, Kreuzlingen (CH)

(73) Assignee: ALSTOM RENEWABLE TECHNOLOGIES, Grenoble (FR)

( * ) Notice: Subject to any disclaimer, the term of this patent is extended or adjusted under 35 U.S.C. 154(b) by 168 days.

(21) Appl. No.: 12/971,604

(22) Filed: Dec. 17, 2010

(65) Prior Publication Data

US 2011/0179643 A1 Jul. 28, 2011

(30) Foreign Application Priority Data

Dec. 22, 2009 (EP) ...................................... 09180299

(51) Int. Cl.
*H01B 19/00* (2006.01)
*H02K 15/12* (2006.01)

(52) U.S. Cl.
CPC ..................................... *H02K 15/12* (2013.01)

(58) Field of Classification Search
CPC ..... H01F 27/38; H01F 27/327; B29C 70/088; H02K 15/12; H02K 3/30; H02K 3/34; H02K 15/105; H02K 3/32
USPC ............ 29/887, 596, 598; 174/120 C, 137 B; 425/116, 129.1, 389, 405.1; 427/237, 427/534
See application file for complete search history.

(56) References Cited

U.S. PATENT DOCUMENTS

| | | | |
|---|---|---|---|
| 5,099,159 A | 3/1992 | Liptak et al. | |
| 6,069,430 A | 5/2000 | Tsunoda et al. | |
| 6,504,102 B2 * | 1/2003 | Tsunoda et al. | 174/137 B |
| 6,827,972 B2 * | 12/2004 | Darras et al. | 427/237 |
| 6,840,749 B2 * | 1/2005 | Klee | 425/116 |

FOREIGN PATENT DOCUMENTS

| | | |
|---|---|---|
| CN | 1042628 A | 5/1990 |
| CN | 1227389 A | 9/1999 |
| JP | 54-030485 | 3/1979 |
| JP | 58-050721 | 3/1983 |
| JP | 5-328650 | 12/1993 |
| JP | 10-174333 | 6/1998 |

OTHER PUBLICATIONS

European Search Report for EP Patent App. No. 09180299.1 (May 25, 2010).
Office Action from European Patent App. No. 09180299.1 (Mar. 19, 2013).
Chinese Office Action dated Jan. 27, 2014, issued by the State Intellectual Property Office of the People's Republic of China in corresponding Chinese Patent Application No. 201010625011.0 and English language translation of Office Action. (9 pages).

* cited by examiner

*Primary Examiner* — Thiem Phan
(74) *Attorney, Agent, or Firm* — Buchanan Ingersoll & Rooney PC

(57) ABSTRACT

A method for insulating (5) a conductive bar (1) includes wrapping an insulating tape (2) around the conductive bar (1), enclosing it in a flexible container (4), applying a vacuum, impregnating the insulating tape (2) with an impregnating resin, curing the impregnating resin, and removing the conductive bar (1) with the insulation (5) around it from the flexible container (4). In addition, together with the insulating tape (2), an impregnating tape (3) made of the impregnating resin is wrapped around the conductive bar (1). In order to impregnate, the impregnating tape (3) is melted.

17 Claims, 3 Drawing Sheets

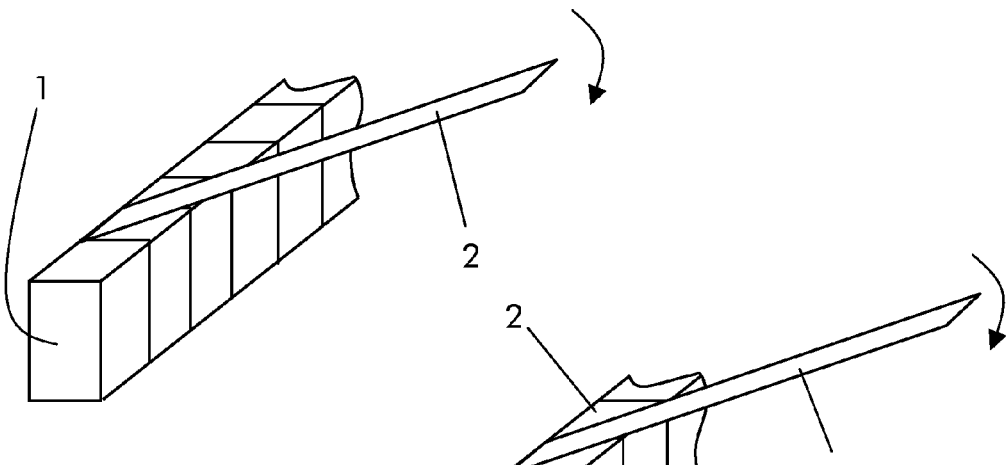
Fig. 1
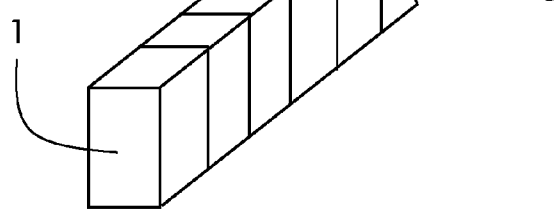
Fig. 2
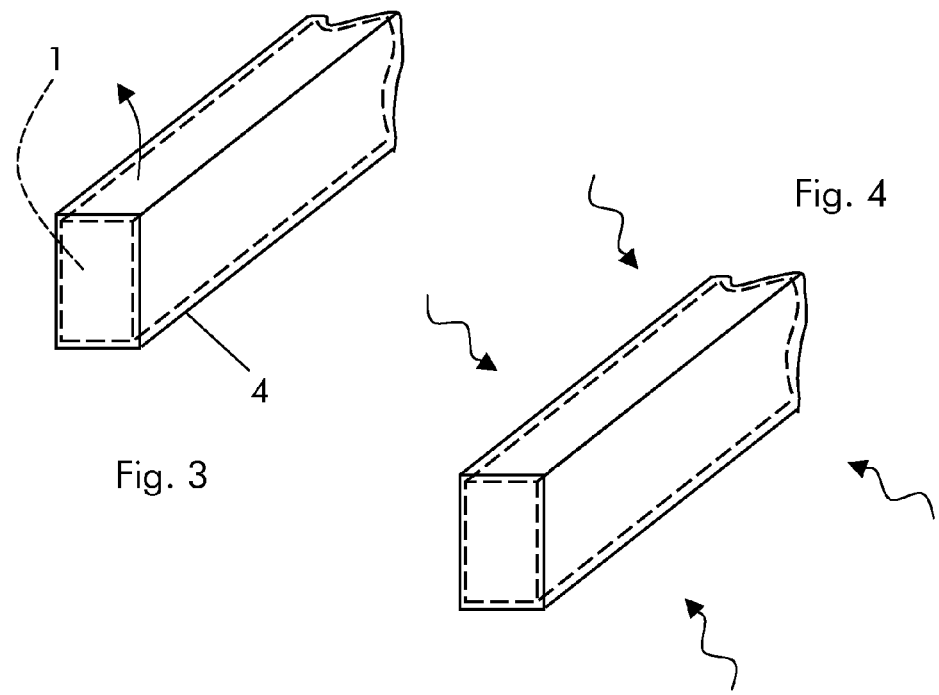
Fig. 3
Fig. 4

METHOD FOR INSULATING A CONDUCTIVE BAR

This application claims priority under 35 U.S.C. §119 to European App. No. 09180299.1, filed 22 Dec. 2009, the entirety of which is incorporated by reference herein.

BACKGROUND

1. Field of Endeavor

The present invention relates to a method for insulating a conductive bar.

In particular the present invention refers to conductive bars made of interwoven conductive strands (Roebel bars) having an insulating mica tape wrapped around them for use in high voltage large electric machines such as large generators.

2. Brief Description of the Related Art

Stator bars of large electric generators have a conductive bar (green bar) made of a plurality of interwoven conductors each provided with an insulating layer.

The conductive bar or green bar is provided with main insulation that is wrapped around it.

The main insulation is manufactured by wrapping one or typically more than one layer of a mica tape around the conductive bar.

The mica tape is thus impregnated with a resin that is then cured, in order to create a compact and stiff insulation around the conductive bar.

Usually, in order to impregnate the mica tape, either the Resin-Rich process or the VPI process are used; in the following, these processes are briefly described.

Resin-Rich Process

According to the Resin-Rich process, a mica tape having a backing layer and a mica layer pre-impregnated with a B stage impregnating resin in a large amount is used.

In particular, the mica tape is first wrapped around the conductive bar and then it is pressed, to expel the excess of B stage impregnating resin contained within the mica tape therefrom.

Thus the B stage resin is cured, in order to transform the B stage resin into A stage resin that has the mechanical and electrical properties required.

The Resin-Rich process proved to have these drawbacks: pre-impregnated mica tapes for Resin Rich impregnation are very expensive, and thus the conductive bars whose mica tape is impregnated this way are also consequently expensive; separate containers for warming up the pre-impregnated mica tape and curing the resin are required; and void filling is not optimal, since some voids are closed before impregnation by the adhesive tape.

VPI Process

In the VPI process (or its equivalent, TVPI; in the following reference to VPI will be made) a mica tape having only a backing layer and a mica layer is used (with a minimum amount of resin for bounding the mica and the backing layer together).

During manufacturing, the mica tape is wrapped around the conductive bar, creating one or typically more than one mica tape layer.

Afterwards the conductive bar with the dry mica tape wrapped around it is introduced into a tank wherein vacuum is applied in order to extract all gases (such as air) from the mica tape; then impregnating resin is introduced into the tank under pressure to impregnate the mica tape.

The VPI process also has a number of drawbacks; in particular: the VPI process requires a pressure resistant container that is very expensive; impregnation depends on the permeability of the mica tape; usually very thick mica tape layers are difficult to impregnate; and in case the mica tape contains filler, impregnation is further hindered and in addition the filler may be removed during impregnation.

SUMMARY

One of numerous aspect of the present invention includes a method by which the aforementioned problems of the known art are addressed.

Another aspect of the invention includes a method that can be cheaper than traditional Resin-Rich and VPI methods.

Another aspect of the invention includes a method that allows optimal impregnation, also in the case when the mica tape wrapped around the conductive bar is very thick and contains filler.

A further aspect of the invention includes a method by which high rate void filling is achieved and filler removal during impregnation is prevented or at least largely reduced.

BRIEF DESCRIPTION OF THE DRAWINGS

Further characteristics and advantages of the invention will be more apparent from the description of a preferred but non-exclusive embodiment of the insulating mica tape and method according to the invention, illustrated by way of non-limiting example in the accompanying drawings, in which:

FIGS. 1-6 show different stages of the method in an embodiment of the invention;

DETAILED DESCRIPTION OF EXEMPLARY EMBODIMENTS

With reference to the figures, a method for creating insulation around a conductive bar is illustrated.

The conductive bar 1 is a stator bar of a large electric machine and thus has a plurality of interwoven conductive strands (Roebel bar); the figures show only a portion of the bar.

The method includes wrapping an insulating tape 2 around the conductive bar (FIG. 1) typically with 50% overlapping.

The insulating tape is a mica tape made of a mica paper bounded to a backing layer; for example a mica tape typically used in the VPI or TVPI process may be used.

In addition, together with the insulating tape 2, also an impregnating tape 3 (FIG. 2) made of an impregnating resin is wrapped around the conductive bar 1.

The impregnating tape 3 includes a B stage impregnating resin such as a bisphenol A epoxy resin or a novolac epoxy resin and preferably it is also provided with a supporting material such as a carbon fiber net to increase its mechanical properties. Overlapping of the impregnating tape can be chosen according to the required impregnating resin amount.

The insulating tape 2 and the impregnating tape 3 are wrapped around the conductive bar 1 such that at least one layer of the impregnating tape and at least one layer of insulating tape are alternatively formed.

Figure 7:
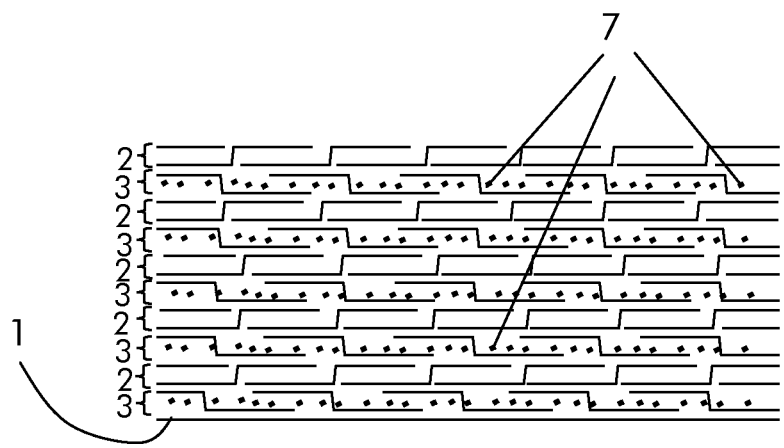
FIGS. 7 and 8 show two different embodiments of mica tape and impregnating tape wrapped around a conductive bar.

In this respect, FIG. 7 shows an example in which one layer of the insulating tape 2 and one layer of the impregnating tape 3 are alternatively wrapped around the conductive bar 1.

In addition, FIG. 7 also shows that the inner layer directly in contact with the conductive bar 1 is made of the impregnating tape 3; in contrast, the outer layer (i.e., the last layer around which no further layer is wrapped) is made of the insulating tape 2.

Figure 8:
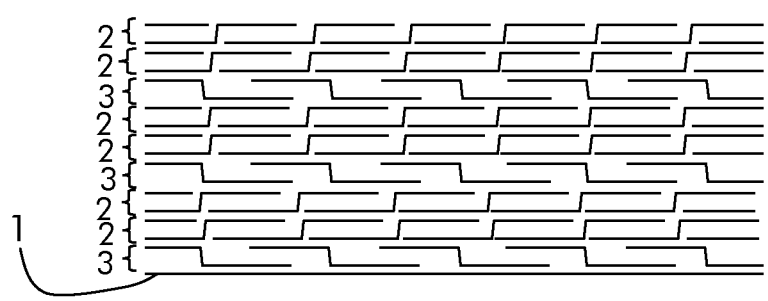

FIG. 8 shows a further example in which a plurality of layers of insulating tape 2 and one layer of impregnating tape 3 are alternatively wrapped around the conductive bar 1.

Also in this example the inner layer is made of an impregnating tape 3 and the outer layer is made of the insulating tape 2.

Naturally in different embodiments the inner layer may also be made of an insulating tape and the outer layer may be made of an impregnating tape.

Afterwards, the conductive bar 1 with the insulating tapes 2 and the impregnating tapes 3 wrapped around it is enclosed in a flexible container 4 (FIG. 3).

The flexible container 4 has the same features as the flexible container described in U.S. Pat. No. 6,840,749.

Thus a vacuum is applied in order to extract the gases contained in the flexible container and, in particular, in the insulating tape, to achieve a high quality impregnation.

In particular, when the vacuum is applied and the gas is extracted, a pressure between 0.1-10 mbar is achieved in the flexible container 4.

Thus the insulating tape 2 is impregnated with the impregnating resin; in this respect the impregnating tape 3 wrapped together with the insulating tape 2 is melted (FIG. 4), such that the impregnating resin moves towards the insulating tape 2 and impregnates it.

Figure 5:
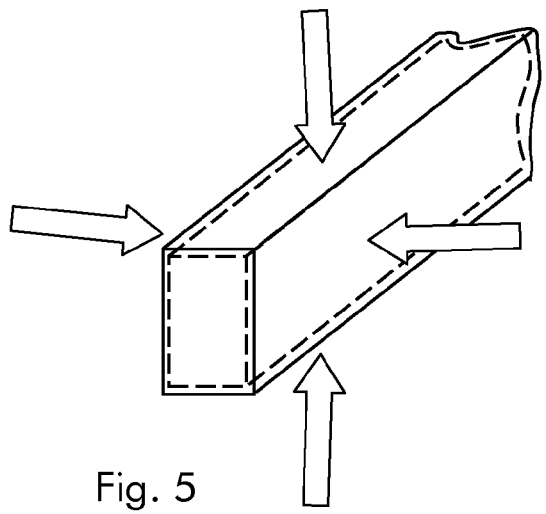
Figure 6:
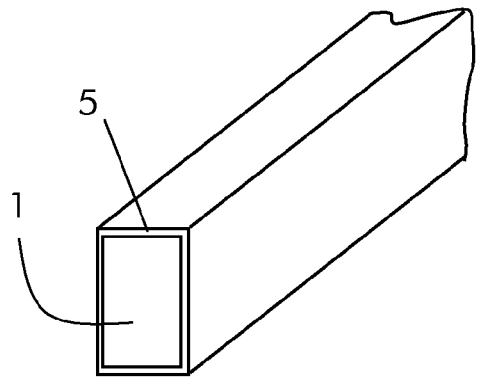

Afterwards the impregnating resin is cured (FIG. 5) and thus the conductive bar 1 with the insulation 5 around it is removed from the flexible container 4 (FIG. 6).

In order to melt the impregnating tape without starting the curing of the impregnating resin at too early a stage (FIG. 4), the impregnating tape 3 is warmed up to a first temperature lower than the curing temperature of the impregnating resin.

Figure 3A:
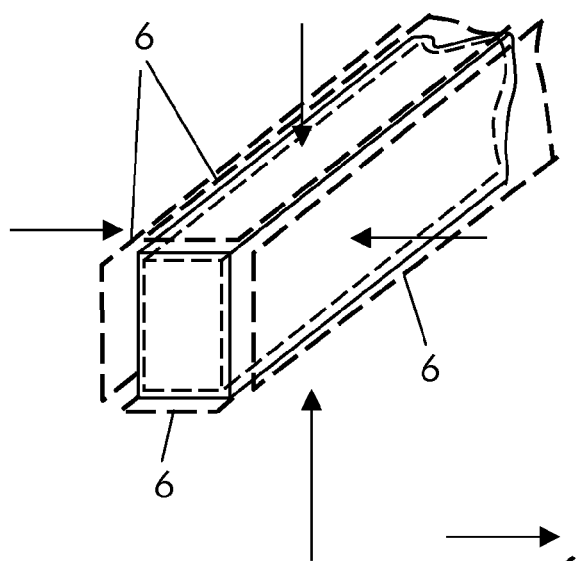
FIGS. 3a and 4a shows further stages of the method of FIGS. 1-6.

FIG. 3a shows a possible shaping stage that could be performed after the conductive bar 1 with the insulating tape 2 and the impregnating tape 3 wrapped around it has been inserted into the flexible container 4 and before impregnation.

Shaping is achieved by pressing; for example a metal plate 6 is pressed against each of the sides of the conductive bar 1 (having the insulating tape 2 and the impregnating tape 3).

After pressing, one or more metal plates 6 can be moved away from the conductive bar 1 and the flexible container 4 may be stretched, removing any crinkle.

Figure 4A:
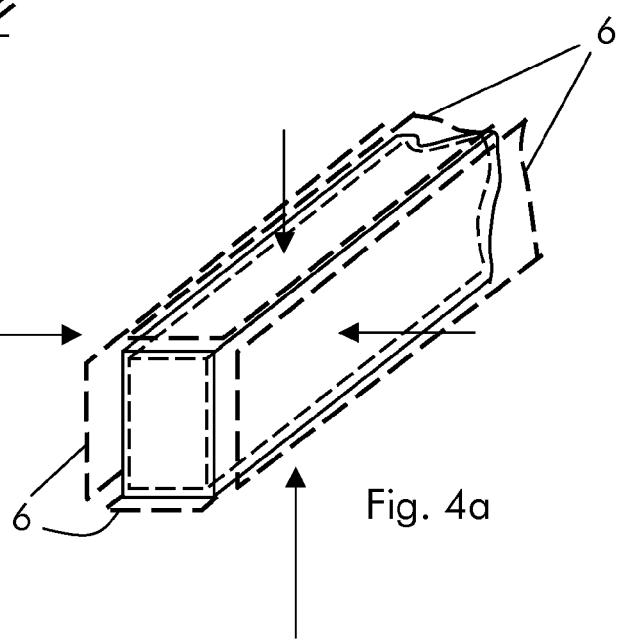

In addition, FIG. 4a shows a further possible stage, in which the insulating tape 2 is also pressed during impregnation.

Also in this case pressing is achieved via the metal plates 6 pressed against each of the sides of the conductive bar 1.

In this case, pressing advantageously begins after impregnation has already started.

Methods embodying principles of the present invention permit a short impregnating time be achieved. In fact, since the impregnating tape (that contains the impregnating resin) is wrapped in alternate layers with the insulating tape to be impregnated, during impregnation the resin has only to impregnate a very limited thickness of the insulating tape.

In addition, as known, usually also filler is included in the insulation 5 in order to improve the electrical and/or the thermo-conductive properties of the insulation 5.

In this respect the impregnating tape 3 that constitutes one or more of the impregnating tape layers may contain filler 7 (FIG. 7).

The filler 7 is known to hinder impregnation and to make impregnation very slow.

Advantageously, as already explained, because of the limited insulating tape thickness to be impregnated, according to the method of the invention, also in cases in which the filler 7 is provided, a quick impregnation is achieved.

In addition, filler removal is prevented, because the path, through which the impregnating resin has to go through, is very small.

Naturally the features described may be independently provided from one another.

The impregnating mica tape and the methods described herein are susceptible to numerous modifications and variants, all falling within the scope of the inventive concept; moreover all details can be replaced by technically equivalent elements.

In practice the materials used and the dimensions can be chosen at will according to requirements and to the state of the art.

REFERENCE NUMBERS 1 conductive bar
2 insulating tape
3 impregnating tape
4 flexible container
5 insulation
6 metal plates
7 filler While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A method for insulating a conductive bar, the method comprising:
   wrapping a first insulating tape around the conductive bar;
   wrapping a second impregnating tape made of an impregnating resin around the conductive bar;
   enclosing the conductive bar with the insulating tape and the impregnating tape around it in a flexible container;
   applying a vacuum to the container;
   impregnating the insulating tape with the impregnating resin, including melting the impregnating tape;
   curing the impregnating resin; and
   removing the conductive bar with the insulation around it from the flexible container.

2. The method according to claim 1, further comprising:
   shaping the insulating tape and the impregnating tape before said impregnating.

3. The method according to claim 2, wherein said shaping comprises pressing.

4. The method according to claim 3, wherein the conductive bar comprises a plurality of interwoven conductive strands.

5. The method according to claim 1, wherein applying a vacuum comprises reaching a pressure between 0.1-10 mbar in the flexible container.

6. The method according to claim 1, further comprising: pressing the insulating tape during said impregnating.

7. The method according to claim 6, wherein said pressing begins after a start of said impregnating.

8. The method according to claim 1, wherein melting comprises warming the impregnating tape up to a first temperature lower than a curing temperature of the impregnating tape.

9. The method according to claim 1, wherein said wrapping an insulating tape and said wrapping an impregnating tape comprise alternatingly wrapping at least one layer of the impregnating tape and at least one layer of insulating tape around the conductive bar.

10. The method according to claim 9, wherein wrapping an impregnating tape comprises wrapping directly in contact with the conductive bar as an innermost layer.

11. The method according to claim 9, wherein wrapping an insulating tape comprises wrapping as an outermost layer.

12. The method according to claim 1, wherein wrapping an impregnating tape comprise wrapping with at least one impregnating tape layer containing filler.

13. The method according to claim 1, wherein the insulating tape comprises a mica tape made of a mica paper bound to a backing layer.

14. The method according to claim 1, wherein the impregnating tape comprises a B stage impregnating resin.

15. The method according to claim 14, wherein the impregnating tape comprises a supporting material.

16. The method according to claim 1, wherein the insulating tape and the impregnating tape are separate tapes.

17. The method according to claim 1, wherein the first insulating tape is wrapped at least 360° around the outer circumference of the conductive bar until the surface of the conductive bar is continuously and completely covered by the first insulating tape, and wherein the second impregnating tape is wrapped at least 360° around the circumference of the conductive bar such that the second impregnating tape makes continuous, direct contact with the first continuous layer of insulating tape along at least 360° of the first, continuous layer of insulating tape.

* * * * *